US008681645B2

(12) United States Patent
Chen

(10) Patent No.: US 8,681,645 B2
(45) Date of Patent: Mar. 25, 2014

(54) SYSTEM AND METHOD FOR COORDINATED DISCOVERY OF THE STATUS OF NETWORK ROUTES BY HOSTS IN A NETWORK

(75) Inventor: John Anthony Chen, Ashburn, VA (US)

(73) Assignee: Time Warner Cable Inc., New York, NY (US)

( * ) Notice: Subject to any disclaimer, the term of this patent is extended or adjusted under 35 U.S.C. 154(b) by 533 days.

(21) Appl. No.: 13/035,152

(22) Filed: Feb. 25, 2011

(65) Prior Publication Data
US 2012/0218907 A1 Aug. 30, 2012

(51) Int. Cl.
*H04L 12/26* (2006.01)
(52) U.S. Cl.
USPC .......................................... 370/252; 370/503
(58) Field of Classification Search
USPC ........................................................ 370/231
See application file for complete search history.

(56) References Cited

U.S. PATENT DOCUMENTS

2001/0005361 A1* 6/2001 Lipsanen ....................... 370/238
2007/0097859 A1* 5/2007 Tancevski et al. ............ 370/228

* cited by examiner

Primary Examiner — Wanda Z Russell
(74) Attorney, Agent, or Firm — The Marbury Law Group, PLLC

(57) ABSTRACT

Systems and methods for coordinated discovery of the status of network routes by hosts in a network. A plurality of host devices is connected to at least one of a plurality of egress devices. Each of the plurality of host devices is assigned to at least one cluster group. A cluster group may include one or more host devices connected to a common egress device. A master node is selected from the members of each cluster group. The master node coordinates the issuance of probe messages from the master node and other members of the cluster group to the common egress device. The probes provide the status of a network route to and through the common egress device. The master node makes the status available to the members of the cluster group. A member of the cluster group may obtain the status by communicating with the master node or by communicating with other members of its cluster group.

22 Claims, 3 Drawing Sheets

SYSTEM AND METHOD FOR COORDINATED DISCOVERY OF THE STATUS OF NETWORK ROUTES BY HOSTS IN A NETWORK

BACKGROUND

A common network architecture utilizes a host device that has access to multiple network egress points. This architecture may be utilized in wired, wireless and hybrid networks.

FIG. 1 illustrates such an architecture in which hosts A, B, C, D, E, F, and G connect via a shared medium with egress device 1 220, egress device 2 222, and egress device 3 224. Each host may have logical links to different egress devices. As illustrated in FIG. 1, hosts A, B, C and D are linked to egress device 1 220. Hosts C, D and E are linked to egress device 2 222. Hosts B, C, F and G are linked to egress device 3 224. The egress devices 220, 222, and 224 provide a physical and logical connection to a network 200.

The actual physical connection of host and an egress device may involve any number of network devices. For example, a host may connect to one or more hubs and/or switches (represented in FIG. 1 by the shared medium). Other devices may be interposed between the host and an egress device and between an egress device and the network 200.

FIG. 2 illustrates another common architecture in which the multi-paths are provided over different shared media thereby providing for redundancy and failover protection. As illustrated in FIG. 2, hosts A, B, C and D are linked to egress device 1 220 via shared medium 230. Hosts C, D and E are linked to egress device 2 222 via shared medium 232. Hosts B, C, F and G are linked to egress device 3 224 via shared medium 234.

A host may detect the status of its physical link (i.e., whether it is physically/electrically connected, or not). A physical interface of a host may be lost due to a failure or disconnection of a cable or the failure of a switch or hub to which the physical link is connected.

A host may also check the efficacy of a logical path by sending probes. A probe confirms that the host is able to communicate by sending messages to a number of devices in the path. As long as these devices respond to the probe, a logical link is considered operational. When the devices do not react in a certain time, the link is considered as failed and the host will attempt to roll-over to a different path.

Referring to FIGS. 1 and 2, the hosts A-G may randomly test their data paths to egress devices to which they are connected using probe messages. The probe messages travel over the same paths as other data. The probe messages are not coordinated. As a consequence, bandwidth and processing that would otherwise be available for data communications are consumed to respond to the continuous stream of probe messages. More hosts mean more probe messages and further network degradation. In addition, the probing messages may cause the static or default route device to become unstable due to delays in servicing the tests instead of servicing their original intended function (routing traffic).

SUMMARY

Embodiments herein are directed to the coordinated discovery of the status of network routes by hosts in a network.

DETAILED DESCRIPTION

As used herein, the term "host" encompasses an end point device in a network that is connected to an egress device. By way of illustration and not by way of limitation, a host device may be a network device (wired or wireless), a network enabled camera, a motion sensor, a wireless speaker, a video display, or an IPTV STB to name a few.

As used herein, an "egress device" encompasses a device that connects one or more hosts to a network. By way of illustration and not by way of limitation, an egress device may be a router, a cable modem, an optical network terminal, a bridge or a wireless access point.

As used herein, a "cluster group" encompasses one or more hosts that are related via a common egress device.

As used herein, the term "node" encompasses a point in a command and control hierarchy of a network associated with one or more cluster groups.

Figure 3:
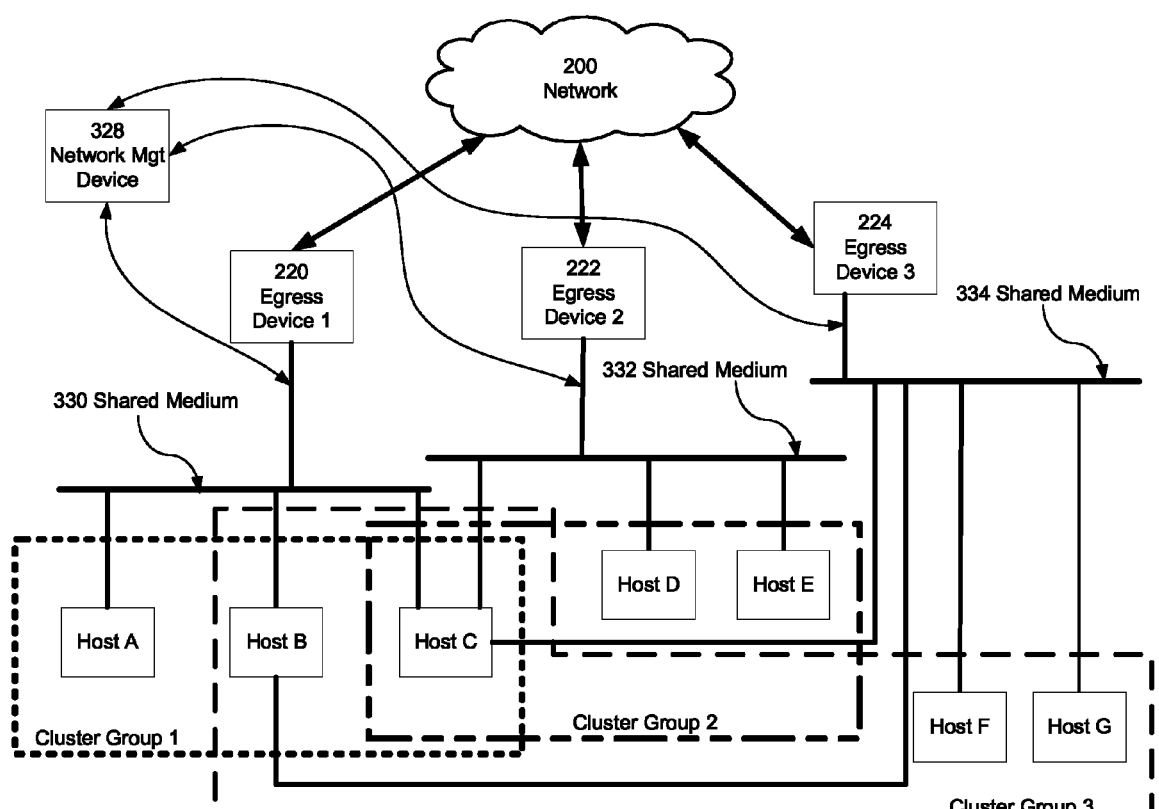
FIG. 3 is a block diagram illustrating a network in which cluster groups are utilized according to an embodiment.

FIG. 3 is a block diagram illustrating a network architecture in which multiple hosts are organized into cluster groups according to an embodiment.

Figure 1:
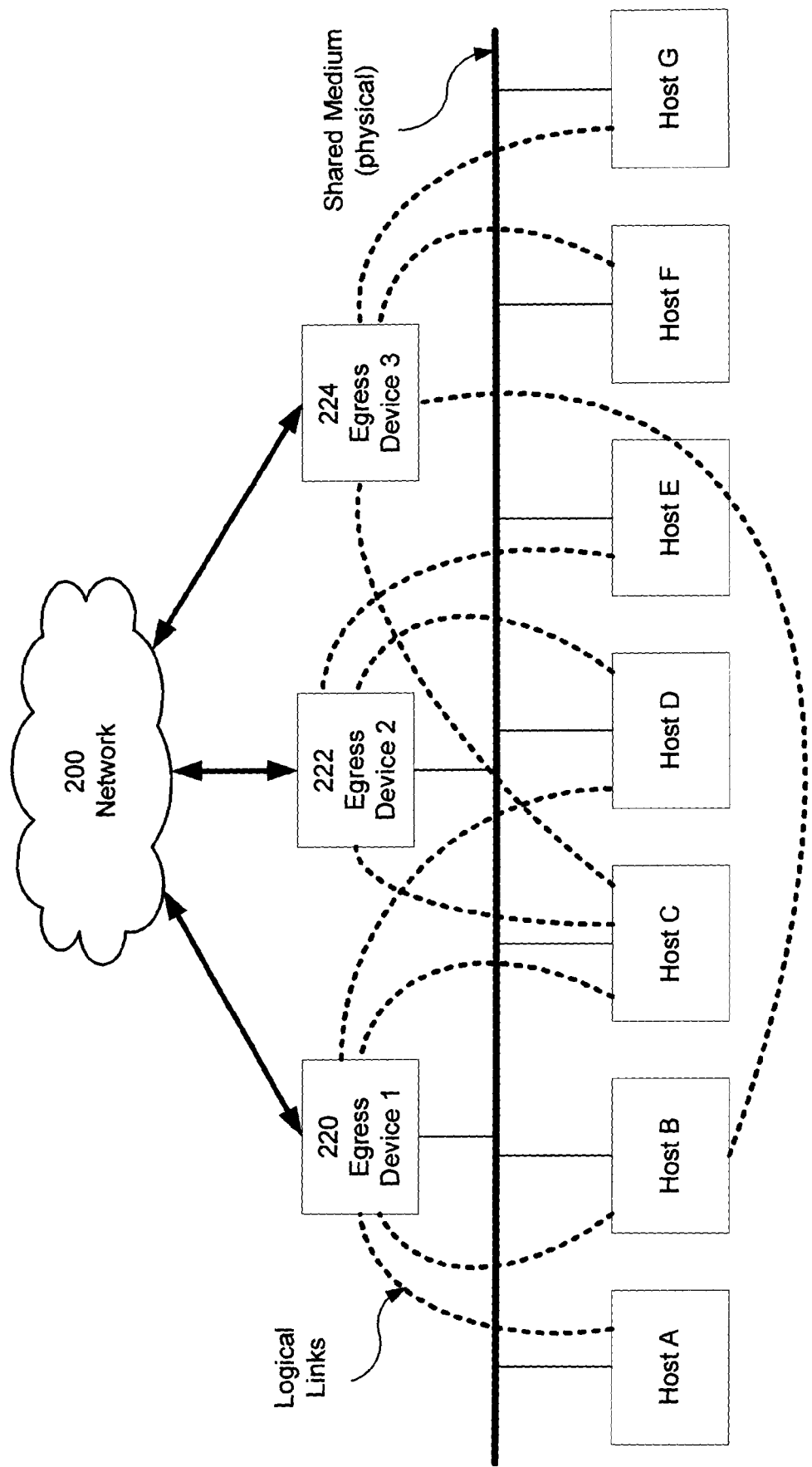
FIG. 1 is a block diagram illustrating a network architecture as known in the prior art.
Figure 2:
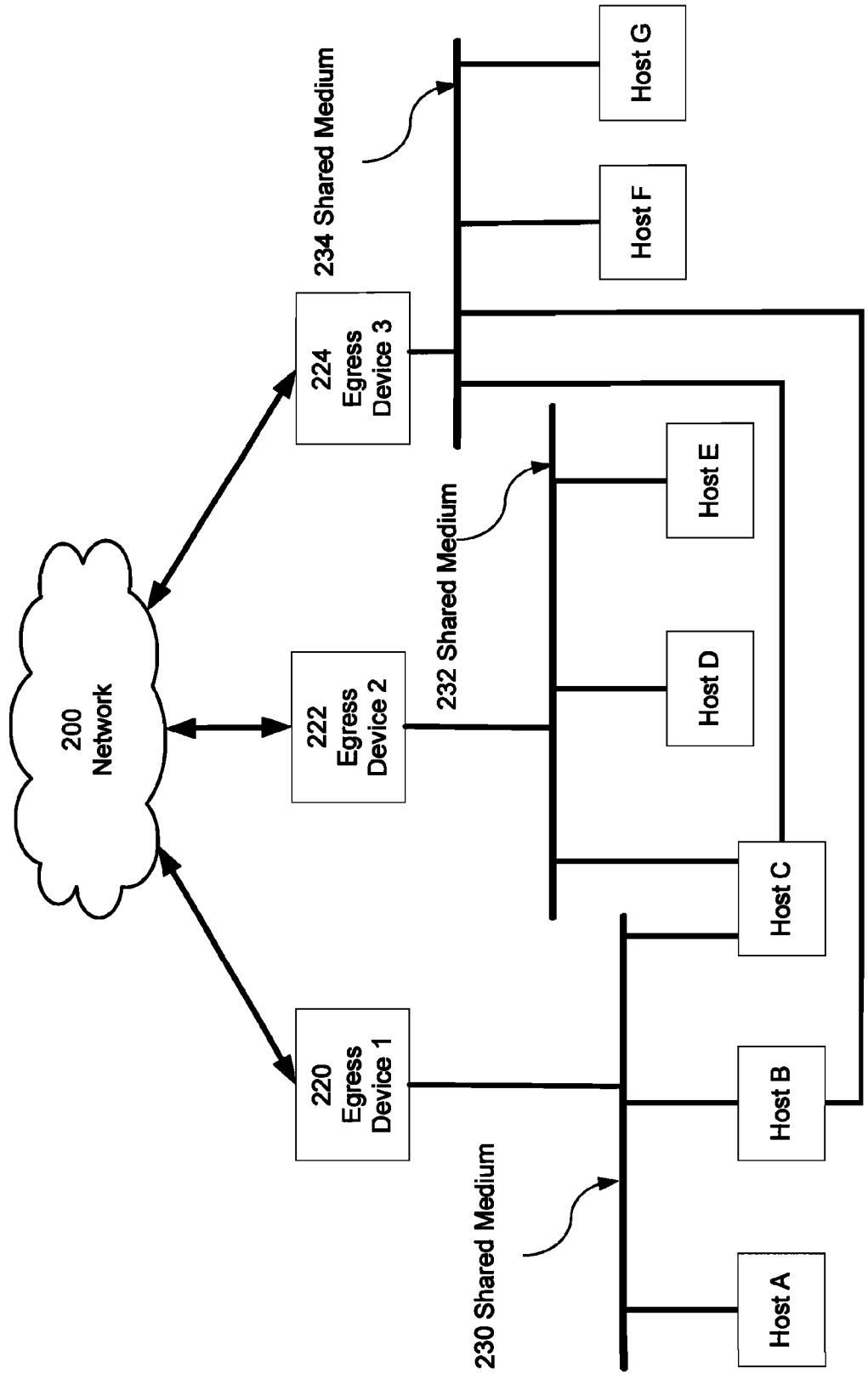
FIG. 2 is a block diagram illustrating a redundant network architecture as known in the prior art.

As discussed in regards to FIG. 2, the network architecture in FIG. 3 provides hosts A, B, C, D, E, F, and G different paths to network 200. In an embodiment, the hosts are assigned to a cluster group based on the egress device with which they are associated. Cluster group 1 is associated with egress device 220 and includes hosts A, B and C, which hosts are connected by a shared medium 330. Cluster group 2 is associated with egress device 222 and includes hosts C, D and E, which hosts are connected by a shared medium 332. Cluster group 3 is associated with egress device 224 and includes hosts B, C, G and F, which hosts are connected by a shared medium 334.

A cluster group provides its members the ability to determine the integrity of a path in a controlled manner. Considering cluster group 1 for discussion purposes, one of the hosts A, B and C is designated as a "master" node. The determination of which host is assigned the role of master node may be made on the basis of rules appropriate to the network. For example, a host, such as host C, that is associated with multiple egress devices (220, 222 and 224) may be selected. Alternatively, the rules may include a measure of host reliability, a measure of host resources, a measure of host usage and a host confirmation interval. The selection may be made by the hosts (A, B and C), by the egress device to which the hosts are commonly connected (220), or by an optional network management device 328.

In an embodiment, the network management device 328 monitors the members of each cluster group, applies selection rules to the members of each cluster group, and determines the master node from the cluster group members in accordance with the selection rules. In another embodiment, the network management device 328 determines when a new host device connects to the network, identifies the egress devices to which the new host device is connected, and assigns the new host device to at least one of the plurality of cluster groups. In yet another embodiment, the network management device 328 also functions as a host device.

Again for discussion purposes, consider that host C is the master node. In this role, host C will coordinate the issuance of probe messages from itself and hosts A and B. The coordination may be in accordance with rules established by the egress device to which the hosts are commonly connected (220) or by the network management device 328.

By way of illustration and not as a limitation, a host may require confirmation of a route to the network 200 each interval "T." In an embodiment, the master node (host C) may send probe messages to egress device 1 220 each interval T. Because hosts A, B and C are connected via a shared medium, they may communicate with each other without involving the egress device 220. The hosts may also support the confirmation needs of each other based on simple associative logic: if host C has a path to the network 200 and host A and host B can communicate with host C, then host A and host B have a path to the network. In this way, hosts A and B may use the knowledge of the master node (host C) to determine the status of the network path.

The communications with the master node (host C) may be made more efficient by staggering the confirmation time interval for each of the member hosts of the cluster group. Additionally, the master node (host C) may comprise logic which requires a host to first check with other hosts in the cluster group before sending probe messages over the network.

In another embodiment, the probing requirements of the member hosts may not be the same. For example, host B may require confirmation of a route each interval "2T" and host A may require confirmation of a route each interval "3T." The confirmation intervals assumed for hosts A, B and C above permit host C (the master node) to issue probes to egress device 220 each interval T. Host B may then query host C each interval 2T to determine if host C has a path through the egress device 220 to network 200. Host A may query host B for confirmation information. The confirmation data may comprise a time that host B last received confirmation information from host C and the result of that query. If host B's confirmation information is within 3T intervals from host A's last confirmation, then host A can rely on host B's confirmation information. If host B's confirmation information is more than 3T intervals from host A's last confirmation, then host A can query host C (the master node) for confirmation information. If for any reason host A cannot obtain confirmation information from hosts B and/or C that is timely, then host A may send a probe message to egress device 220.

The sharing of confirmation information among the members of a cluster group reduces the number of probe messages that are sent over the shared media. The confirmation intervals assumed for hosts A, B and C above permit the hosts A and B to rely on probes sent by the master node (host C), or its delegates.

Wireless networks may also benefit from using cluster groups to ascertain connectivity to a network. In a fixed wireless network, the egress devices 220, 222 and 224 may be access points (APs) which route traffic to network 200. The hosts A, B, C, D, E, F and G may be fixed (immobile) wireless devices. The hosts may communicate wirelessly in an ad hoc (peer-to-peer) mode. In this configuration, the hosts will behave as previously described.

Wireless networks in which hosts may roam among multiple networks may also benefit from using cluster groups to ascertain connectivity to a network. In an embodiment, the egress devices 220, 222 and 224 may be access points (APs) which route traffic to network 200. The hosts A-G roam and thus may be in a cluster group for only a short period of time. Cluster groups may be formed dynamically and the election of a master node may depend on factors selected by the network operator. By way of illustration and not by way of limitation, factors in selecting a master node may include egress bandwidth, latency, reliability, AP signal strength, distance, etc. Such factors may be collected and aggregated by each mobile device (host) and scored. In an embodiment, the scores are reported to current master node. The mobile device (host) that has the best score at a particular point in time is elected the master node. In addition, the now newly elected master node assumes the responsibility to collect and aggregate all of the scores of the cluster group.

When a host is within range of two or more APs, the host may elect to obtain a score of an existing cluster bound to an AP from the current master node, and calculate its own score and decide whether or not to join based on that comparison. Once a host decides to join a cluster group, which may be by virtue of "associating" with the AP, a new election takes place where each mobile device collects and aggregates its scores and the best scoring device is elected master node.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

An operating environment for the described embodiments may include a processing system with at least one high speed central processing unit ("CPU") or other processing unit and a memory system. The operating environment may be included in a device, computer or server that is used in conjunction with the various embodiments, including without limitation the hosts, nodes and egress devices referred to above.

It will be appreciated that the acts and symbolically represented operations or instructions include the manipulation of electrical signals by the CPU. An electrical system with data bits causes a resulting transformation or reduction of the electrical signal representation and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium readable by the CPU or other processing unit. The computer readable medium includes cooperating or interconnected computer readable media, which exist exclusively on the processing system or are distributed among multiple interconnected processing systems that may be local or remote to the processing system.

Further, in view of many embodiments to which the principles of the invention may be applied, it should be understood that the illustrated embodiments are exemplary embodiments and should not limit the present invention as defined by the claims. For example, functionality that has been described in reference to a single device may be applied simultaneously or sequentially to any number of devices. Unless specified to the contrary, the steps of the flow charts may be taken in sequence other than those described, and more, fewer or equivalent elements or components could also be used.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A system for discovery of a status of a network route by a host comprising:
   one or more egress devices, wherein each egress device provides a connection to an external network; and
   a plurality of host devices each connected to a common egress device, wherein the plurality of host devices forms a cluster group corresponding to the common egress device to which they are connected; and
   wherein the cluster group comprises a master node selected from the members of the cluster group, and
   wherein the master node comprises a first processor configured with software executable instructions to cause the master node to perform operations comprising:
      coordinating issuance of probe messages from itself and other members of the cluster group to the common egress device;
      determining whether a response to a probe message issued at a time T is received from the common egress device within a time interval measured from time T;
      determining a status of the network route to and through the common egress device based on the determination; and
      making available to the members of the cluster group the status of the network route to and through the common egress device.

2. The system of claim 1, wherein the plurality of host devices is selected from the group consisting of a network device (wired or wireless), a network enabled camera, a motion sensor, a wireless speaker, a video display, and an IPTV STB.

3. The system of claim 1, wherein the one or more egress devices are selected from the group consisting of a router, a cable modem, an optical network terminal, a bridge and a wireless access point.

4. The system of claim 1, further comprising a network management device, wherein the network management device comprises a second processor configured with software executable instructions to cause the network management device to perform operations comprising:
   determining when a new host device connects to at least one of the one or more egress devices;
   identifying the egress devices to which the new host device is connected; and
   assigning the new host device to at least one of the plurality of cluster groups associated with the egress devices to which the new host is connected.

5. The system of claim 1, further comprising a network management device, wherein the network management device comprises a second processor configured with software executable instructions to cause the network management device to perform operations comprising:
   monitoring the members of each cluster group;
   applying selection rules to the members of each cluster group;
   selecting the master node from the cluster group members in accordance with the selection rules.

6. The system of claim 5, wherein the selection rules are selected from the group consisting of a measure of a number of egress devices to which a cluster group member is connected, a measure of the computing resources of a cluster group member, a measure of usage of a cluster group member, a measure of reliability of a cluster group member and a measure of a frequency that a cluster group member requires the status of the network route.

7. The system of claim 5, wherein the network management device is one of the plurality of host devices.

8. The system of claim 1, wherein each host device is associated with a probing interval rule that establishes a frequency that the host device requires the status of the network route and wherein the instruction for coordinating the issuance of probe messages comprises:
   determining a probing interval that satisfies the probing interval rule for each member of the cluster group; and
   sending probes to the common egress device at the probing interval.

9. The system of claim 1, wherein the instruction for making available to the members of the cluster group the status of a network route comprises sending the status of the network route to at least one member of the cluster group.

10. The system of claim 9, wherein the members of the cluster group are connected via a shared medium and wherein the at least one member of the cluster group is configured for making the status of the network route available to other members of the cluster group.

11. The system of claim 10, wherein the shared medium is selected from the group consisting of a wired medium and a wireless medium.

12. A method for discovery of a status of a network route comprising:
   connecting each of a plurality of host devices to a common egress device;
   assigning each of the plurality of host devices to a cluster group corresponding to the common egress device to which they are connected;
   selecting a master node from the members of each cluster group;
      coordinating using the master node the issuance of probe messages from the master node and other members of the cluster group to the common egress device;
      determining whether a response to a probe message issued at a time T is received from the common egress device within a time interval measured from time T;
      determining a status of the network route to and through the common egress device based on the determination; and
   making available using the master node the status of a network route to and through the common egress device.

13. The method of claim 12, wherein the plurality of host devices is selected from the group consisting of a network device (wired or wireless), a network enabled camera, a motion sensor, a wireless speaker, a video display, and an IPTV STB.

14. The method of claim 12, wherein the one or more egress devices are selected from the group consisting of a router, a cable modem, an optical network terminal, a bridge and a wireless access point.

15. The method of claim 12 further comprising:
determining using a network management device when a new host device connects to at least one of the one or more egress devices;
identifying using the network management device the egress devices to which the new host device is connected; and
assigning using the network management device the new host device to at least one of the plurality of cluster groups associated with the egress devices to which the new host is connected.

16. The method of claim 12 further comprising:
monitoring using the network management device the members of each cluster group;
applying using the network management device selection rules to the members of each cluster group;
selecting using the network management device the master node from the cluster group members in accordance with the selection rules.

17. The method of claim 16, wherein the selection rules are selected from the group consisting of a measure of a number of egress devices to which a cluster group member is connected; a measure of the computing resources of a cluster group member, a measure of usage of a cluster group member, a measure of reliability of a cluster group member and a measure of a frequency that a cluster group member requires the status of the network route.

18. The method of claim 16, wherein the network management device is one of the plurality of host devices.

19. The method of claim 12, wherein each host device is associated with a probing interval rule that establishes a frequency that the host device requires the status of the network route and wherein coordinating the issuance of probe messages comprises:
determining a probing interval that satisfies the probing interval rule for each member of the cluster group; and
sending probes to the common egress device at the probing interval.

20. The method of claim 12, wherein the instruction for making available to the members of the cluster group the status of a network route comprises sending the status of the network route to at least one member of the cluster group.

21. The method of claim 20, wherein the members of the cluster group are connected via a shared medium and wherein the method further comprises configuring the at least one member of the cluster group for making the status of the network route available to other members of the cluster group.

22. The method of claim 21, wherein the shared medium is selected from the group consisting of a wired medium and a wireless medium.

* * * * *

UNITED STATES PATENT AND TRADEMARK OFFICE
CERTIFICATE OF CORRECTION

| | | |
|---|---|---|
| PATENT NO. | : 8,681,645 B2 | Page 1 of 1 |
| APPLICATION NO. | : 13/035152 | |
| DATED | : March 25, 2014 | |
| INVENTOR(S) | : John Anthony Chen | |

It is certified that error appears in the above-identified patent and that said Letters Patent is hereby corrected as shown below:

Title Page, item (73) Assignee

Please delete "Time Warner Cable, Inc." and insert --Time Warner Cable Enterprises LLC--

Signed and Sealed this
Twenty-eighth Day of April, 2015

Michelle K. Lee
*Director of the United States Patent and Trademark Office*